(12) United States Patent
Kawamura et al.

(10) Patent No.: US 9,094,382 B2
(45) Date of Patent: *Jul. 28, 2015

(54) ELECTRONIC KEY REGISTRATION SYSTEM

(71) Applicant: KABUSHIKI KAISHA TOKAI RIKA DENKI SEISAKUSHO, Aichi (JP)

(72) Inventors: Daisuke Kawamura, Aichi (JP); Hiroaki Iwashita, Aichi (JP); Masaki Hayashi, Aichi (JP); Toshihiro Nagae, Aichi (JP); Hisashi Kato, Aichi (JP); Tetsuya Egawa, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 28 days.

This patent is subject to a terminal disclaimer.

(21) Appl. No.: 13/903,233

(22) Filed: May 28, 2013

(65) Prior Publication Data
US 2013/0332736 A1    Dec. 12, 2013

(30) Foreign Application Priority Data

Jun. 6, 2012 (JP) ................. 2012-129306

(51) Int. Cl.
*H04L 9/32* (2006.01)
*H04L 29/06* (2006.01)
*H04L 9/08* (2006.01)
(Continued)

(52) U.S. Cl.
CPC .............. *H04L 63/061* (2013.01); *B60R 25/24* (2013.01); *G07C 9/00817* (2013.01); *H04L 9/0816* (2013.01); *H04L 9/0869* (2013.01); *H04L 9/3271* (2013.01); *G07C 2009/00492* (2013.01); *H04L 2209/80* (2013.01); *H04L 2209/84* (2013.01)

(58) Field of Classification Search
CPC .................................................. H04L 63/0442
USPC .......................................................... 713/150
See application file for complete search history.

(56) References Cited

U.S. PATENT DOCUMENTS

| 5,708,712 A | 1/1998 | Brinkmeyer et al. |
| 5,838,251 A | 11/1998 | Brinkmeyer et al. |
| 8,335,925 B2 * | 12/2012 | Taugbol ........................ 713/185 |

(Continued)

FOREIGN PATENT DOCUMENTS

| JP | 2009-302848 | 12/2009 |
| JP | 2011-020475 | 2/2011 |

OTHER PUBLICATIONS

U.S. Appl. No. 13/863,469 to Takahiro Shimizu et al., filed Apr. 16, 2013.

(Continued)

*Primary Examiner* — Thanhnga B Truong
*Assistant Examiner* — Khalil Naghdali
(74) *Attorney, Agent, or Firm* — Greenblum & Bernstein, P.L.C.

(57) ABSTRACT

An immobilizer ECU transmits a vehicle ID code and a SEED code, which is read from an electronic key, to a data center online. The data center generates an encryption key from the received SEED code and a first logic, and generates a further SEED code from the encryption key, the vehicle ID code, and a second logic. The immobilizer ECU obtains the further SEED code online from the data center, generates the encryption key from the obtained further SEED code, the vehicle ID code, and the second logic, and stores the encryption key.

7 Claims, 9 Drawing Sheets

(51) Int. Cl.
*B60R 25/24* (2013.01)
*G07C 9/00* (2006.01)

(56) References Cited

U.S. PATENT DOCUMENTS

| | | | |
|---|---|---|---|
| 2008/0059806 A1* | 3/2008 | Kishida et al. | 713/186 |
| 2010/0208895 A1* | 8/2010 | Boneh et al. | 380/278 |
| 2010/0220857 A1 | 9/2010 | Kawamura et al. | |
| 2010/0333186 A1* | 12/2010 | Chan et al. | 726/10 |
| 2012/0124385 A1* | 5/2012 | Klasen et al. | 713/179 |

OTHER PUBLICATIONS

U.S. Appl. No. 13/871,333 to Daisuke Kawamura et al., filed Apr. 26, 2013.
U.S. Appl. No. 13/874,794 to Daisuke Kawamura et al., filed May 1, 2013.
U.S. Appl. No. 13/903,342 to Daisuke Kawamura et al., filed May 28, 2013.
Search report from E.P.O., mail date is Mar. 17, 2014.

* cited by examiner

Initial Manufacturing

Fig.3

Initial Registration

Additional Electronic Key Manufacturing (Online)

Fig.6
Additional Electronic Key Registration (Online)

Fig.7A
Additional Registration (Online)

| Registration Tool 8 | Immobilizer ECU 6 | Electronic Key 2b |
|---|---|---|

- S21: Additional Registration Command
- Additional Registration Signal →
- S22: Additional Registration Mode
- S23: Read Key ID and Seed
- Key ID-Seed Request →
- S24: Transmit Key ID-Seed Signal
- ← Key ID-Seed Signal
- S25: Write Key ID
- S26: Request Seed Generation Memory 42

| Vehicle ID | – |
|---|---|
| Key ID | KID-2 |
| Seed | SC-2h |
| Encryption Key | K-2 |

Memory 69

| Initial Registration Flag | Prohibit |
|---|---|
| Additional Registration Flag | Permit |
| Vehicle ID | VID-A |
| Additional Key ID | – |
| Additional Encryption Key | – |

Memory 69

| Initial Registration Flag | Prohibit |
|---|---|
| Additional Registration Flag | Permit |
| Vehicle ID | VID-A |
| Additional Key ID | KID-2 |
| Additional Encryption Key | – |

Fig.8
Additional Electronic Key Manufacturing (Offline)

Fig.9
Additional Electronic Key Registration (Offline)

ELECTRONIC KEY REGISTRATION SYSTEM

CROSS-REFERENCE TO RELATED APPLICATIONS

This application is based upon and claims the benefit of priority from prior Japanese Patent Application No. 2012-129306, filed on Jun. 6, 2012, the entire contents of which are incorporated herein by reference.

BACKGROUND ART

The present invention relates to a registration system that registers an electronic key to a controller of a communication subject.

A known electronic key system performs wireless communication between a vehicle and an electronic key, which is held by a user of the vehicle to lock and unlock doors or start and stop the engine when the electronic key is verified. In such an electronic key system, the communication between the electronic key and the vehicle is encrypted and thereby protected to maintain a certain level of security (for example, refer to Japanese Laid-Open Patent Publication No. 2009-302848).

Encrypted communication may be performed by employing symmetric-key cryptosystem that uses the same encryption key for encryption and decryption. A shared key, that is, the same encryption key, is registered to an electronic key and a vehicle that perform encrypted communication in compliance with the symmetric-key cryptosystem. The registration of the encryption key to the electronic key and the vehicle is performed when registering the electronic key to a controller of the vehicle. The controller verifies the electronic key by comparing identification information received from the electronic key with identification information stored in its memory.

In an electronic key registration system that registers an electronic key to a controller, to avoid registration of an electronic key other than that of the user, the inventors of the present invention have considered storing in advance a vehicle ID code (identification information unique to a communication subject) of a vehicle (communication subject) to the controller and the electronic key, and then shipping the controller and the electronic key together out of a factory. In this example, however, the shipping becomes complicated, and an additional electronic key cannot be registered at a later date. The inventors of the present invention have also considered shipping out the controller, which stores a vehicle ID, and the electronic key separately from a factory. However, in this case, someone may tamper with the vehicle ID code. Such a problem is not limited to an electronic key system used in a vehicle and may also occur in an electronic key system used in a building such as a house.

SUMMARY

It is an object of the present invention to provide an electronic key registration system that facilitates registration of an electronic key to a controller while maintaining a certain security level.

To achieve the above object, one aspect of the present invention is an electronic key registration system that registers an electronic key to a communication subject. The electronic key registration system includes a controller arranged in the communication subject and capable of accessing a data center through at least a network. An initial electronic key, a first additional electronic key, and a second additional electronic key, each hold a unique key ID code and a unique encryption key. Each encryption key is used for encrypted communication between the corresponding electronic key and the communication subject to perform verification. A computer-readable medium has instructions stored thereon that include first to fifth set of instructions. The first set of instructions is configured to store a communication subject ID code in the controller when manufacturing the controller. The second set of instructions is configured to generate, with the first additional electronic key, the encryption key of the first additional electronic key by performing a computation using a first encryption key generation code stored in the first additional electronic key and a first logic; store the generated encryption key in the first additional electronic key; and manufacture the first additional electronic key. The third set of instructions is configured to transmit, with the controller to the data center online, the communication subject ID code and the first encryption key generation code that is stored in the first additional electronic key; generate, with the data center, the electronic key encryption key of the first additional electronic key by performing a computation using the received first encryption key generation code and the first logic; generate, with the data center, a second encryption key generation code by performing a computation using the generated electronic key encryption key, the communication subject ID code, and the second logic; obtain, with the controller online, the second encryption key generation code from the data center; generate, with the controller, the encryption key of the first additional electronic key by performing a computation using the communication subject ID code, the obtained second encryption key generation code, and the second logic; and store, in the controller, the generated electronic key encryption key to register the first additional electronic key. The fourth set of instructions is configured to store, in the second additional electronic key, the communication subject ID code corresponding to information indicated on an order sheet, a third encryption key generation code used to generate the encryption key of the second additional electronic key, the encryption key of the second additional electronic key generated by performing a computation using the communication subject ID code, the third encryption key generation code, and a second logic; and manufacture the second additional electronic key. The fifth set of instructions are configured to read, with the controller, the third encryption key generation code from the second additional electronic key; generate, with the controller that is disconnected from the data center, the encryption key of the second additional electronic key by performing a computation using the third encryption key generation code, the communication ID code stored in the controller, and the second logic; and store, in the controller that is disconnected from the data center, the encryption key of the second additional electronic key.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF EMBODIMENT

An electronic key registration system according to a first embodiment of the present invention will now be described with reference to FIGS. 1 to 16.

Figure 1:
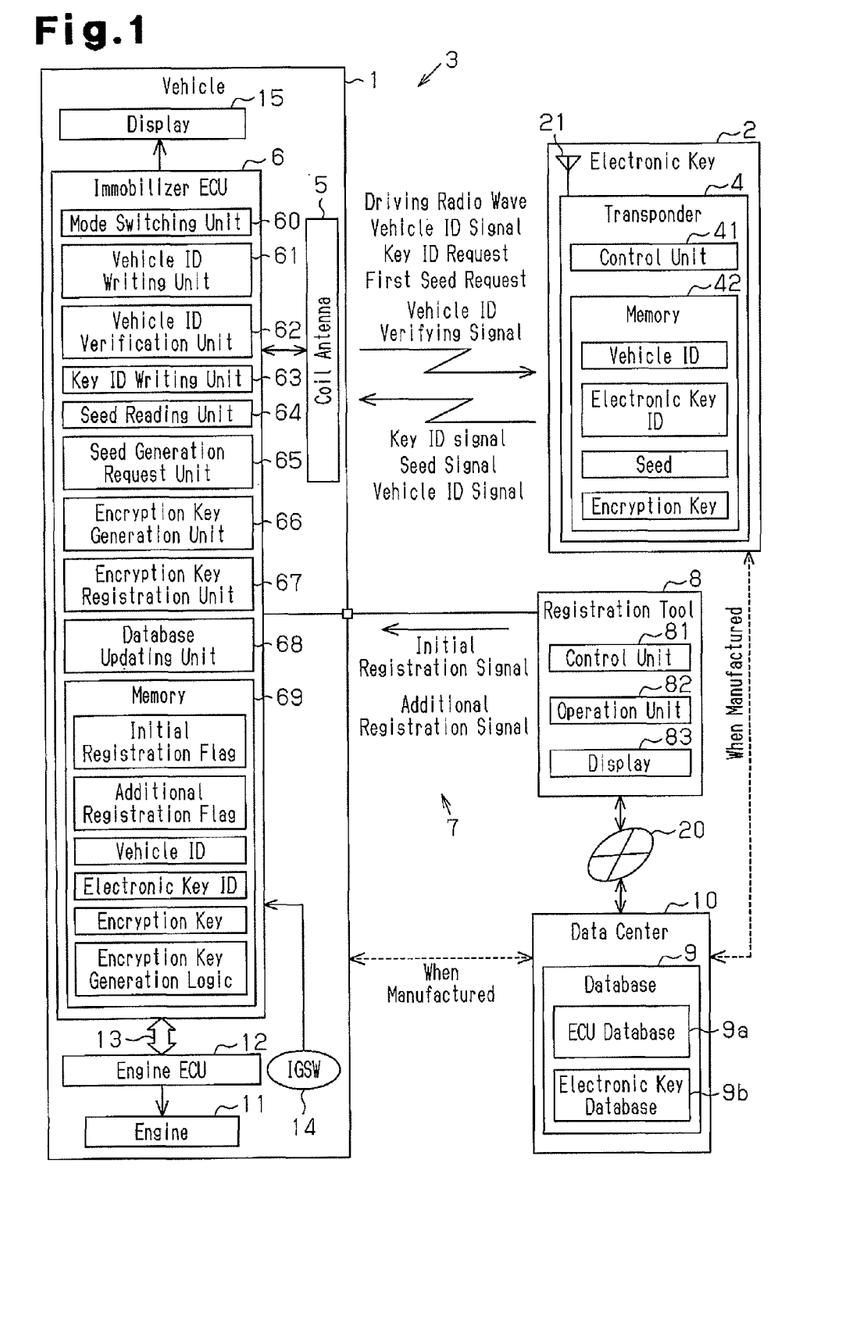
FIG. 1 is a block diagram of an electronic key registration system.

Referring to FIG. 1, a vehicle 1 includes an immobilizer that performs, for example, near field communication with an electronic key 2 to execute ID verification. In the description hereafter, near field communication refers to wireless communication performed within a communication distance of several centimeters. The electronic key 2 includes a transponder 4, which may be an ID tag. The transponder 4 is activated by drive radio waves transmitted from a coil antenna 5 of the vehicle 1, and transmits a key ID signal. The immobilizer system 3 includes an immobilizer ECU 6. The immobilizer ECU 6 performs ID verification based on the key ID signal sent from the transponder 4. The vehicle 1 is one example of a communication subject. The immobilizer system 3 is one example of an electronic key system. The immobilizer ECU 6 is one example of a controller.

An in-vehicle LAN 13 connects the immobilizer ECU 6 to an engine ECU 12, which controls an engine 11. The immobilizer ECU 6 includes a memory 69. An ID code of the electronic key 2 is registered to the memory 69. The ID code of the electronic key 2 is associated with the vehicle 1. The immobilizer ECU 6 is connected to the coil antenna 5 that is capable of transmitting and receiving radio waves on, for example, the low frequency (LF) band and a high frequency (HF) band. In the preferred example, the coil antenna 5 is a magnetic field antenna and arranged in a key cylinder.

The transponder 4 includes a control unit 41 that controls the communication operation of the transponder 4. The control unit 41 includes a memory 42. A key ID code KID unique to the electronic key 2 is registered to the memory 42. The key ID code KID may be a transponder code. The transponder 4 includes a transmission-reception antenna 21 that is capable of transmitting and receiving radio waves on LH band radio waves and HF band radio waves. The antenna 21 may have the same structure as a coil antenna 5.

When detecting the insertion of the electronic key 2 into the key cylinder, the immobilizer ECU 6 intermittently transmits drive radio waves from the coil antenna 5. For example, if a user enters the vehicle 1 and inserts the electronic key 2 into the key cylinder to start the engine 11, when the key cylinder is operated, the transponder 4 receives the drive radio waves transmitted from the coil antenna 5 with the transmission-reception antenna 21. The drive radio waves function as a power supply that activates the transponder 4. The activated transponder 4 transmits a key ID signal, which includes the key ID code, from the transmission-reception antenna 21. When the coil antenna 5 receives the key ID signal from the transponder 4, the immobilizer ECU 6 performs ID verification (immobilizer verification) on the key ID code in the received key ID signal. When ID verification is accomplished, the immobilizer ECU 6 stores an ID verification accomplishment flag in the memory 69.

An ignition switch (IGSW) 14 is arranged in the key cylinder to detect the rotational position of the electronic key 2. For example, when the ignition switch 14 detects that the electronic key 2 has been arranged at an engine start position, the engine ECU 12 receives an ID verification result from the immobilizer ECU 6. When verification has been accomplished, the engine ECU 12 starts ignition control and fuel injection control for the engine 11 and starts the engine 11.

In addition to verifying the key ID code of the electronic key 2, the immobilizer ECU 6 performs challenge-response verification. The challenge-response verification will now be described. First, the vehicle 1 transmits a challenge code, which is, for example, a random number code, from the vehicle 1 to the electronic key 2. The electronic key 2 computes a response code and sends back the response code to the vehicle 1. The immobilizer ECU 6 of the vehicle 1 also computes a response code and determines whether or not the computed response code conforms to the response code received from the electronic key 2. When the response codes are in conformance, the electronic key 2 is verified. In the illustrated example, symmetric-key cryptosystem that uses the same encryption key is employed for the verifications performed by the immobilizer ECU 6 and the transponder 4. The electronic key 2 and the immobilizer ECU 6 store the same encryption key. Each of the electronic key 2 and the immobilizer ECU 6 performs a computation using the stored encryption key to generate a challenge code from the response code.

The memory 42 of the transponder 4 stores the key ID code KID of the electronic key 2, a SEED code SC used to generate an electronic key encryption key K, and the electronic key encryption key K used for verification. The SEED code SC differs between each electronic key. The SEED code SC is also referred to as an encryption key generation code.

In the description hereafter, the term online refers to a situation in which the immobilizer ECU 6 can communicate with a data center 10 through at least a network 20. The term offline refers to a situation in which the immobilizer ECU 6 cannot communicate with the data center 10 through at least the network 20.

The term initial registration refers to the first registration of the electronic key 2 to the vehicle 1 (e.g., immobilizer ECU 6). The term additional registration refers to the registration of a further electronic key performed when at least one electronic key has already been registered to the vehicle 1 (e.g., after vehicle has been shipped out from a vehicle manufacturer). The term online additional registration refers to the additional registration of an electronic key performed online. The term offline additional registration refers to the additional registration of an electronic key performed offline. The electronic key 2 that undergoes initial registration may be referred to as initial electronic key 2a. The electronic key 2 that undergoes online additional registration may be referred to as an online additional electronic key 2b or a first additional electronic key. The electronic key 2 that undergoes offline additional registration may be referred to as an offline additional electronic key 2c or a second additional electronic key.

An initial registration flag indicating that initial registration of the electronic key 2 is permitted is set in the memory 69 of the immobilizer ECU 6. An additional registration flag indicating that additional registration of the electronic key 2 is permitted is also set in the memory 69. Further, the memory 69 stores a vehicle ID code VID that is unique identification information, an electronic key encryption key K used for verification, and a key generation logic used to generate the electronic key encryption key K. The vehicle ID code VID may be referred to as a communication subject ID code.

The immobilizer system 3 includes an electronic key registration system 7 that registers the electronic key 2 to the immobilizer ECU 6. The electronic key registration system 7 registers the electronic key 2 to the immobilizer ECU 6. The electronic key registration system 7 stores the key ID code KID, which is stored in the electronic key 2, in an electronic key database 9b of the data center 10. The electronic key database 9b holds the key ID code KID for each electronic key 2. The electronic key registration system 7 stores the vehicle ID code VID, which is stored in the immobilizer ECU 6, and the key ID code KID in an ECU database 9a of the data center 10.

The electronic key 2 is registered to the immobilizer ECU 6 by storing, in the immobilizer ECU 6, the key ID code KID and the electronic key encryption key K that are the same as those stored in the electronic key 2. In this registration, the electronic key encryption key K stored in the electronic key 2 is not transmitted from the electronic key 2 to the immobilizer ECU 6. Instead, the immobilizer ECU 6 obtains the SEED code SC from the electronic key 2, generates the electronic key encryption key K from the SEED code SC, and stores the electronic key encryption key K in the immobilizer ECU 6. The immobilizer ECU 6 obtains and stores the key ID code KID of the electronic key 2 from the electronic key 2.

When the electronic key registration system 7 additionally registers an electronic key 2, the immobilizer ECU 6 and a registration tool 8 perform an additional electronic key registration step that differs depending on whether the registration is performed offline or online. Further, the contents stored in the memory 42 of the electronic key 2 in an additional electronic key manufacturing step performed before the additional electronic key registration step differs depending on whether the additional registration is performed online or offline.

Figure 5:
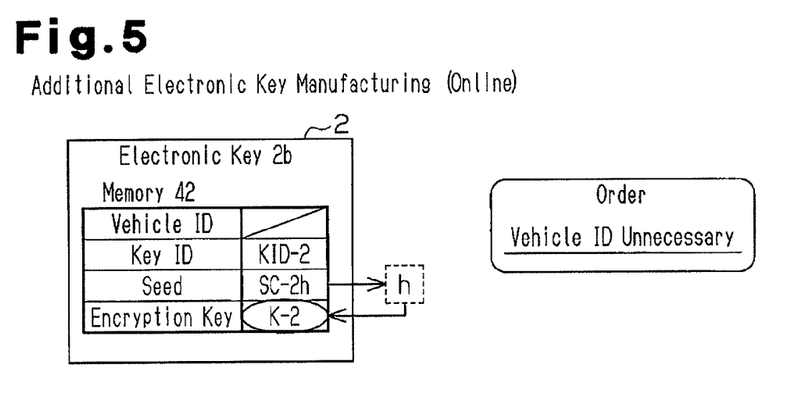
FIG. 5 is a schematic diagram illustrating manufacturing steps of an additional electronic key.

For example, the memory 42 of the offline additional electronic key 2c stores the key ID code KID, the SEED code SC, and the electronic key encryption key K other than the vehicle ID code VID in the additional electronic key manufacturing step (refer to FIG. 5). The immobilizer ECU 6 reads the key ID code KID and the SEED code SC from the online additional electronic key 2b and transmits the vehicle ID code VID and the SEED code SC, which are stored in the immobilizer ECU 6, to the data center 10. The data center 10 generates the SEED code SC. The immobilizer ECU 6 generates and stores in the immobilizer ECU 6 an electronic key encryption key K-2 for the online additional electronic key 2b from the SEED code SC generated in the data center.

Figure 8:
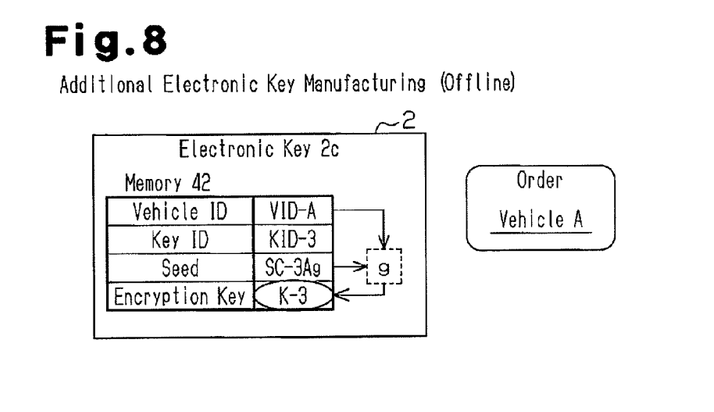
FIG. 8 is a schematic diagram illustrating manufacturing steps of an additional electronic key.

The memory 42 of the offline additional electronic key 2c stores the vehicle ID code VID, the key ID code KID, the SEED code SC, and the electronic key encryption key K, which are used for verification, in the additional electronic key manufacturing step (refer to FIG. 8). The immobilizer ECU 6 checks the vehicle ID code VID of the offline additional electronic key 2c, reads the key ID code KID and the SEED code SC from the offline additional electronic key 2c, and generates the electronic key encryption key K of the offline additional electronic key 2c from the vehicle ID code VID and the SEED code SC.

In the electronic key registration system 7, the registration tool 8 is connected to the vehicle, and the registration tool 8 switches an operation mode of the immobilizer ECU 6 to a registration mode to allow for registration of the electronic key 2 to the immobilizer ECU 6. The registration tool 8 includes a control unit 81, which controls the registration tool 8, an operation unit 82, which detects a registration operation carried out by a person performing registration, and a display unit 83, which displays the registration operation. When the registration tool 8 is set to an initial registration mode for registering a new electronic key 2 by, for example, a person performing the registration, the registration tool 8 provides the vehicle 1 with an initial registration signal that changes the operation mode of the immobilizer ECU 6 to the initial registration mode. Further, in response to the operation of the person performing the registration, the registration tool 8 provides the vehicle 1 with an additional registration signal for changing the immobilizer ECU 6 to an additional registration mode.

The immobilizer ECU 6 includes a mode switching unit 60 that switches operation modes. When provided with an initial registration signal from the registration tool 8, the mode switching unit 60 switches the operation mode to an initial registration mode. When provided with an additional registration signal from the registration tool 8, the mode switching unit 60 switches the operation mode to an additional registration mode.

The immobilizer ECU 6 includes a vehicle ID verification unit 62. The vehicle ID verification unit 62 transmits a vehicle ID request signal from the coil antenna 5 to the electronic key 2. Then, the vehicle ID verification unit 62 checks whether or not the vehicle ID code KID in the vehicle ID transmitted from the electronic key 2 conforms to the vehicle ID code VID registered to the memory 69 of the immobilizer ECU 6.

The immobilizer ECU 6 includes a key ID writing unit 63. The key ID writing unit 63 functions in an initial registration mode to write the key ID code KID read from the electronic key 2 to the memory 69.

The immobilizer ECU 6 includes a SEED reading unit 64 that reads a SEED code SC to generate an electronic key encryption key K stored in the electronic key 2. When functioning in an online or offline registration mode, the SEED reading unit 64 transmits a first SEED request signal, which requests for the SEED code, from the coil antenna 5 and obtains the SEED code from a SEED signal transmitted from the electronic key 2. When functioning in an online additional registration mode, the SEED reading unit 64 transmits the SEED request signal online and obtains the SEED code from the data center 10. When functioning in the initial registration mode, after obtaining the SEED code SC, the SEED reading unit 64 transmits a SEED deletion signal to delete the SEED code SC from the electronic key 2.

The immobilizer ECU 6 includes a SEED generation request unit 65 that instructs the data center 10 to generate a SEED code SC from the electronic key encryption key K. When functioning in the additional registration mode, if the SEED code is not stored in the database 9, the SEED generation request unit 65 transmits a SEED generation signal to the data center. In response to the SEED generation request signal, the data center 10 generates a SEED code SC.

The immobilizer ECU 6 includes an encryption key generation unit 66 that generates an electronic key encryption key K. The encryption key generation unit 66 functions in the initial registration mode and generates the electronic key encryption key K by performing a computation with the SEED code SC, which is obtained by the SEED reading unit 64, and the key generation logic f. The encryption key generation unit 66 also functions in an offline additional registration mode and generates the electronic key encryption key K by performing a computation with the SEED code SC and the vehicle ID code VID, which are obtained by the SEED reading unit 64 from the offline additional electronic key 2c, and a key generation logic g. Further, the encryption key generation unit 66 functions in an online additional registration mode and generates the electronic key encryption key K by performing a computation with the SEED code SC and the vehicle ID code VID, which are obtained by the SEED reading unit 64 from the data center 10, and the key generation logic g. The key generation logic f functions as a third logic, and the key generation logic g functions as a second generation logic.

The immobilizer ECU 6 includes an encryption key registration unit 67 that registers the generated electronic key encryption key K and changes a flag. The encryption key registration unit 67 functions in the initial registration mode and, stores, in the memory 69, the electronic key encryption key K generated by the encryption key generation unit 66 to register the electronic key encryption key K to the immobilizer ECU 6. In the initial registration mode, when an initial registration prohibition operation is detected after the electronic key encryption key K is stored, the encryption key registration unit 67 prohibits initial registration. One example of an initial registration restriction operation is an operation repeating on/off of the ignition switch 14 for twenty times. In the additional registration mode, the encryption key registration unit 67 stores the electronic key encryption key K and prohibits subsequent additional registrations.

The immobilizer ECU 6 includes a database updating unit 68 that stores the key ID code, which is registered to the immobilizer ECU 6, to the database 9. When obtaining the key ID code KID, the database updating unit 68 transmits a data update signal to the database 9 and updates the database 9. The database update signal includes the vehicle ID code VID and the key ID code KID stored in the memory 69 of the immobilizer ECU 6.

With reference to FIGS. 2 to 10, registration of the electronic key 2 to the immobilizer ECU 6 with the electronic key registration system 7 will now be described with reference to FIGS. 2 to 10.

Figure 2:
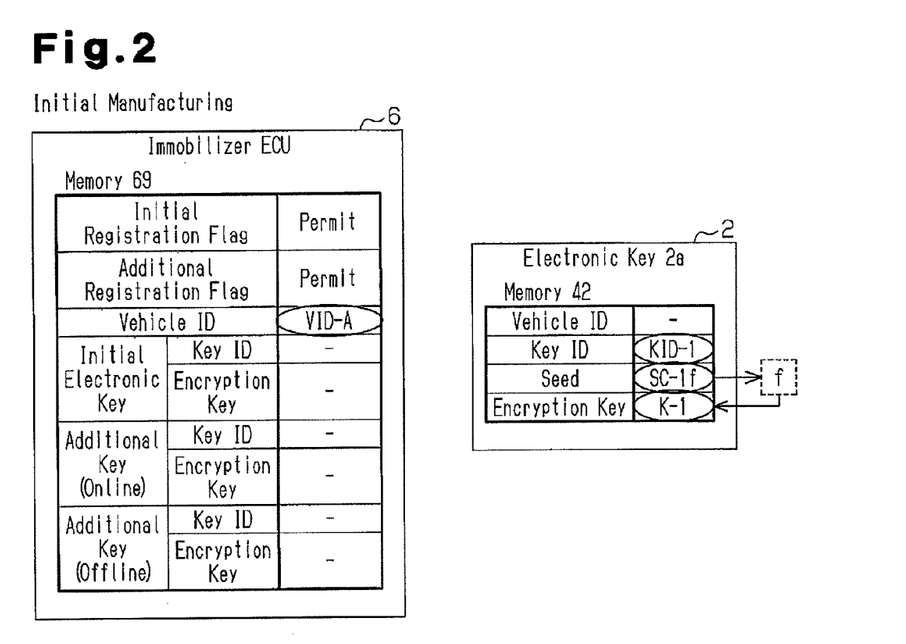
FIG. 2 is a schematic diagram illustrating manufacturing steps of an initial electronic key.

Referring to FIG. 2, in an initial manufacturing step, a vehicle ID code VID-A is stored in the memory 69 of the initially manufactured immobilizer ECU 6. In the memory 69, the initial registration flag indicates that initial registration is permitted, and the additional registration flag indicates that additional registration is permitted. In the initial manufacturing step, the memory 42 of the initial electronic key 2a stores a key ID code KID-1, a SEED code SC-1f, and an electronic key encryption key K-1, which is generated by performing a computation using the SEED code SC-1f and the key generation logic f. The initial manufacturing step includes an initial electronic key manufacturing step.

The registration of the initial electronic key 2a in a factory will now be described with reference to FIGS. 3, 4A and 4B. In the initial registration step, the registration tool 8 is connected to the vehicle 1 to perform a registration operation. The immobilizer ECU 6 is installed in the vehicle 1, and the initial electronic key 2a is registered to the immobilizer ECU 6 installed in the vehicle 1.

Figure 3:
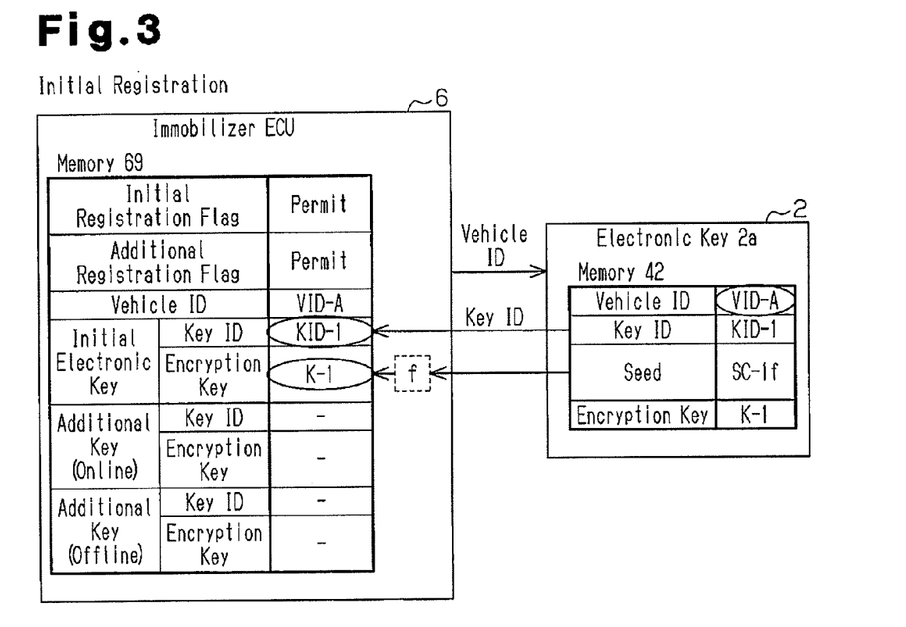
FIG. 3 is a schematic diagram illustrating initial registration steps.

Referring to FIG. 3, in the initial registration step, the immobilizer ECU 6 writes the vehicle ID code VID-A to the electronic key 2. Further, the immobilizer ECU 6 reads the key ID code KID-1 from the electronic key 2 and performs a computation with the SEED code SC-1f from the electronic key 2 and the key generation logic f obtained from the electronic key 2 to generate the electronic key encryption key K-1. Then, the immobilizer ECU 6 stores the electronic key encryption key K-1 in the memory 69. The electronic key 2 deletes the SEED code SC-1f from the memory 42. The ECU database 9a of the data center 10 stores the key ID code KID-1 of the initial electronic key 2a.

Figure 4A:
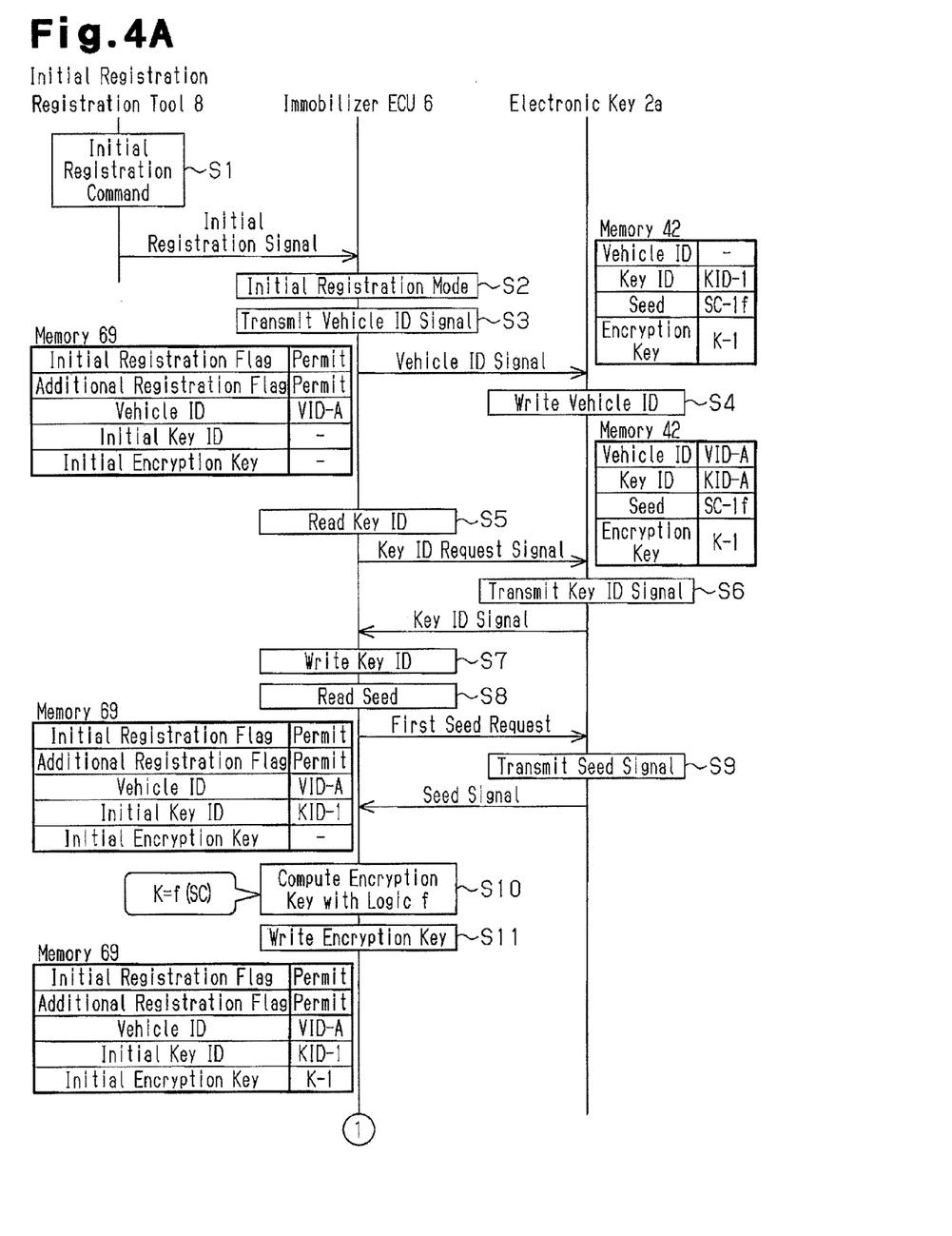
FIGS. 4A and 4B illustrate a sequence chart of the initial registration steps.
Figure 4B:
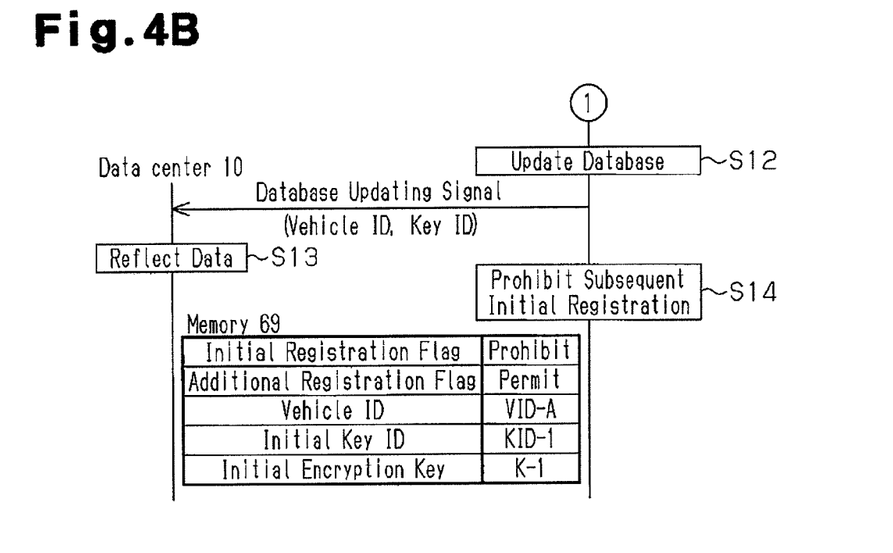

In detail, referring to FIGS. 4A and 4B, when the person performing registration operates the operation unit 82 to set initial registration, the registration tool 8 provides the immobilizer ECU 6 with an initial registration signal, which serves as an initial registration instruction (step S1). When receiving the initial registration signal, the mode switching unit 60 switches the immobilizer ECU 6 to an initial registration mode that registers the electronic key 2 to the immobilizer ECU 6 for the first time (step S2).

Then, the immobilizer ECU 6 transmits a vehicle ID signal (step S3). For example, a vehicle ID writing unit 61 transmits a vehicle ID signal including the vehicle ID code VID-A to the electronic key 2 from the coil antenna 5.

When the electronic key 2 receives the vehicle ID signal, the electronic key 2 writes the vehicle ID code VID, which is included in the vehicle ID signal (step S4). For example, the transponder 4 stores the vehicle ID code VID-A in the memory 42.

Then, the key ID writing unit 63 of the immobilizer ECU 6 transmits a key ID request signal, which requests for the key ID code KID-1, to the electronic key 2 from the coil antenna 5 (step S5).

When the electronic key 2 receives the key ID request signal, the transponder 4 transmits a key ID signal, which includes the key ID code KID-1 stored in the memory 42, to the immobilizer ECU 6 from the transmission-reception antenna 21 (step S6).

When the immobilizer ECU 6 receives the key ID signal, the key ID writing unit 63 writes the key ID code KID-1, which is included in the key ID signal, to the memory 69 (step S7).

After the immobilizer ECU 6 writes the key ID code KID, in step S8, the SEED reading unit transmits a first SEED request signal that requests for the SEED code SC-1f from the coil antenna 5.

When the electronic key 2 receives the first SEED request signal, in step S9, the transponder 4 transmits a SEED signal including the SEED code SC-1f that is stored in the memory 42 from the transmission-reception antenna 21.

In step S10, the SEED reading unit 64 of the immobilizer ECU 6 obtains the SEED code SC-1f from the received SEED signal. The encryption key generation unit 66 performs a computation with the SEED code SC-1f obtained by the SEED reading unit 64 and the key generation logic F to generate an electronic key encryption key K-1. Thus, the immobilizer ECU 6 does not directly obtain the electronic key encryption key K-1 from the electronic key 2. Rather, the immobilizer ECU 6 obtains the SEED code SC-1f from the electronic key 2 and generates the electronic key encryption key K-1 from the SEED code SC-1.

The encryption key registration unit 67 of the immobilizer ECU 6 stores the electronic key encryption key K-1 generated by the encryption key generation unit 66 in the memory 69 (step S11). In this manner, the electronic key encryption key K-1 is registered to the immobilizer ECU 6. The immobilizer ECU 6 uses the registered electronic key encryption key K-1 to allow for immobilizer verification to be performed with the electronic key 2.

In step S12, the database updating unit 68 provides a database update signal via the registration tool 8 to the data center 10 to update the information of the data center 10. The registration tool 8 that receives the database update signal updates the information of the data center 10 through the network 20. In step S13, the data center 10 stores the key ID code KID-1 of the additional registration electronic key 2 in the ECU database 9a.

When the initial registration prohibition operation is detected (step S14), the encryption key registration unit 67 prohibits initial registration. Thus, the immobilizer ECU 6 does not perform initial registration of the electronic key 2.

Additional registration of the electronic key 2b performed online will now be described with reference to FIGS. 5 to 7B.

With reference to FIG. 5, a step for manufacturing the online additional electronic key 2b that may be registered online will now be described. The online additional electronic key 2b is manufactured in, for example, a key manufacturing factory. Since the online additional electronic key 2b can be registered online, an order sheet for manufacturing the online additional electronic key 2b does not have to include a vehicle ID code VID that specifies a vehicle. A key ID code KID-2, a SEED code SC-2h, and an electronic key encryption key K-2, which is generated through a computation using the SEED code SC-2h and a key generation logic h, are stored in the memory 42 of the online additional electronic key 2b. The key generation logic functions as a first generation logic.

An online additional registration step performed at an approved location such as a maintenance garage will now be described with reference to FIGS. 6, 7A and 7B. In the online additional registration step, the registration tool 8 and the vehicle 1 are communicable with the data center 10 through the network 20. In the illustrated example, the registration tool 8 is connected to the vehicle 1, and the vehicle 1 is communicable with the data center 10 through the registration tool 8.

Figure 6:
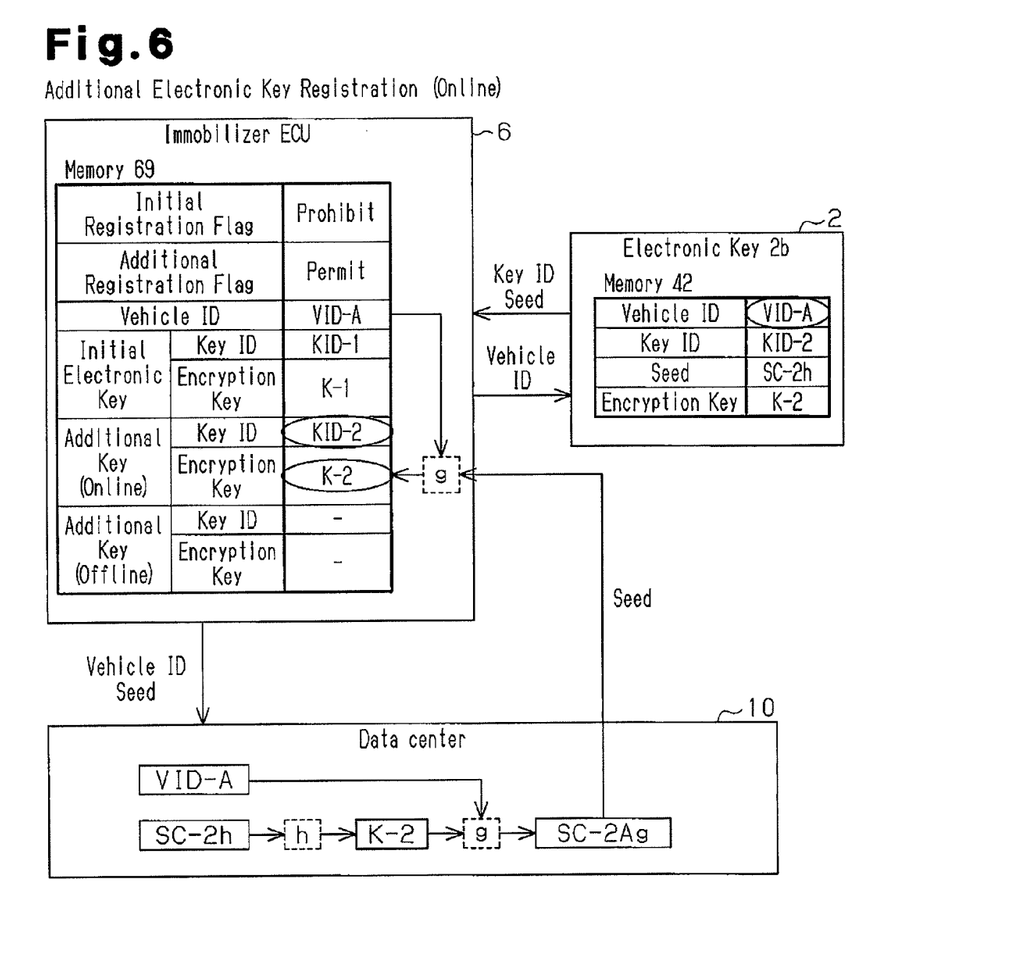
FIG. 6 is a schematic diagram illustrating registration steps of the additional electronic key.

Referring to FIG. 6, in the online additional registration step, the immobilizer ECU 6 reads the SEED code SC-2h from the online additional electronic key 2b. The immobilizer ECU 6 transmits the vehicle ID code VID-A and the SEED code SC-2h of the electronic key 2b to the data center 10. The data center 10 generates a SEED code SC-A2. The data center 10 generates the electronic key encryption key K-2 by performing a computation using the SEED code SC-A2 and the key generation logic h. Further, the data center 10 generates a SEED code SC-2Ag by performing a computation using the generated electronic key encryption key K-2, the vehicle ID code VID-A, and the key generation logic g. The immobilizer ECU 6 reads the generated SEED code SC-2Ag from the data center 10. The immobilizer ECU 6 generates the electronic key encryption key K-2 by performing a computation using the vehicle ID code VID-A, the read SEED code SC-2Ag, and the key generation logic g. The immobilizer ECU 6 stores the generated electronic key encryption key K-2 and the key ID code KID-2, which is read from the electronic key 2b, in the memory 69. Simultaneously or subsequently, the data center 10 stores the key ID code KID-2 of the electronic key 2b in the ECU database 9a. The immobilizer ECU 6 transmits the vehicle ID code VID-A to the electronic key 2b. The SEED code SC-2Ag corresponds to a second encryption key generation code.

Figure 7A:
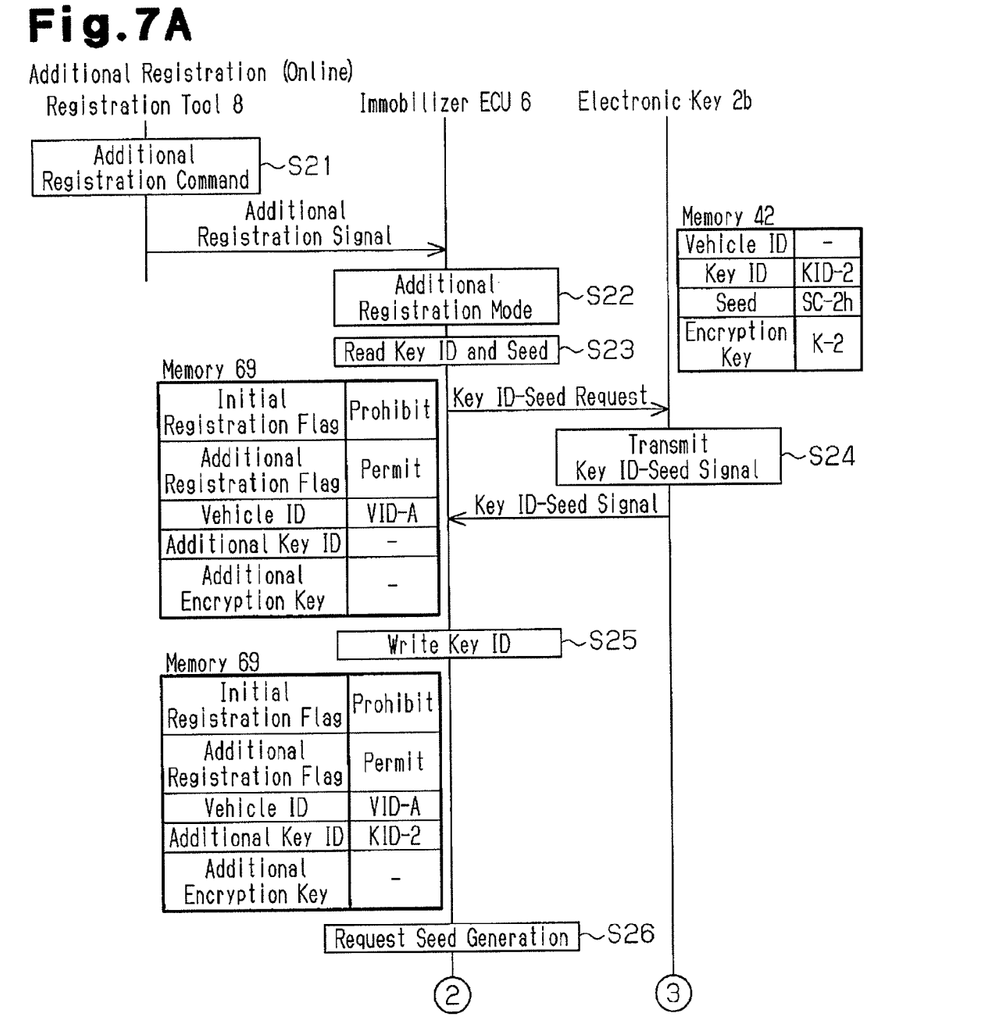
FIGS. 7A and 7B illustrate a sequence chart of the registration steps of the additional electronic key.
Figure 7B:
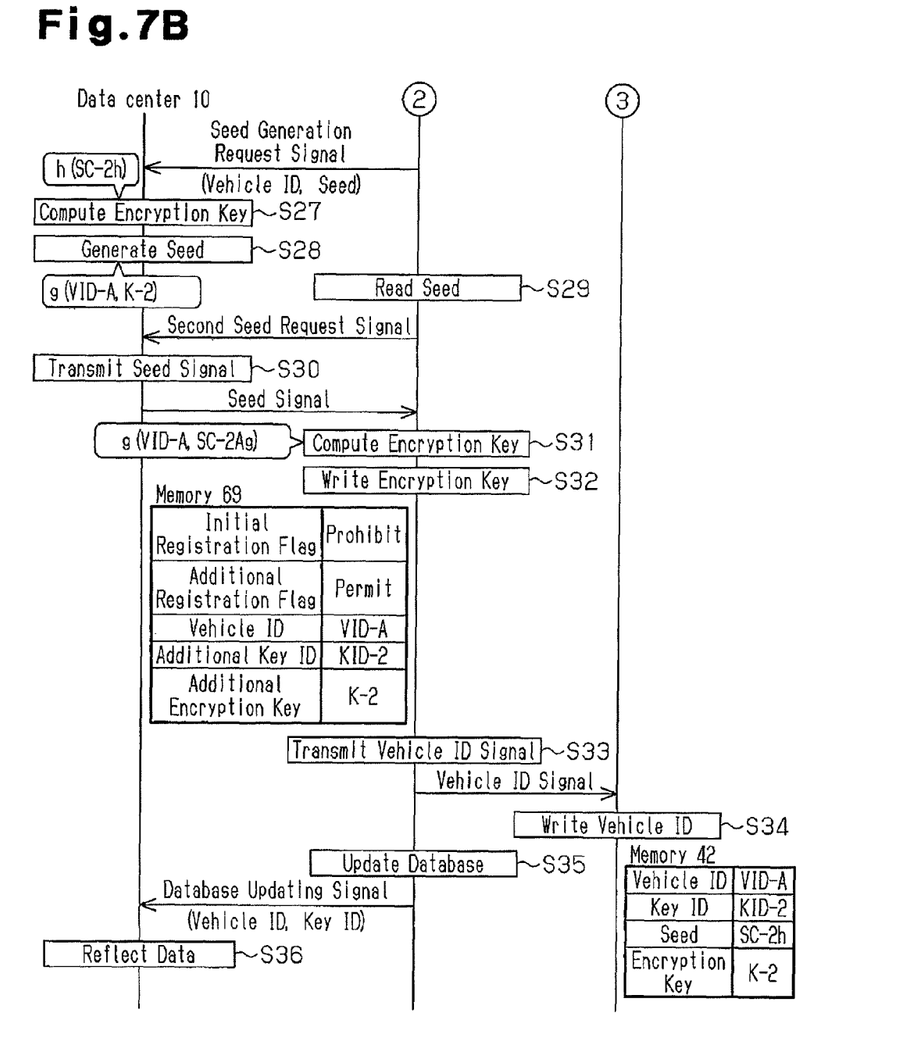

In detail, as shown in FIGS. 7A and 7B, when a person performing the registration operates the operation unit 82 and sets additional registration, the registration tool 8 provides the immobilizer ECU 6 with an additional registration signal as an additional registration instruction (step S21). When receiving the additional registration signal, the immobilizer ECU 6 switches the operation mode to the additional registration mode (step S22). For example, the mode switching unit 60 switches to the additional registration mode that additionally registers the electronic key 2b to the immobilizer ECU 6.

The immobilizer ECU 6 reads the key ID code KID and the SEED code SC (step S23). For example, the key ID writing unit 63 transmits a key ID-SEED request signal, which requests for the key ID code KID and the SEED code, to the electronic key 2b from the coil antenna 5.

When receiving the key ID-SEED request signal, the electronic key 2 transmits a key ID-SEED signal including the key ID code KID and the SEED code SC (step S24). For example, the transponder 4 transmits a key ID-SEED signal including the key ID code KID-2 and the SEED code SC-2h that are stored in the memory 42 from the transmission-reception antenna 21 to the immobilizer ECU 6.

When receiving the key ID-SEED signal, the immobilizer ECU 6 writes the key ID code KID-2, which is included in the key ID-SEED signal, to the memory 69 (step S25).

Then, the immobilizer ECU 6 transmits the vehicle ID code VID and the SEED code SC to the data center 10, and requests the data center 10 to generate the SEED code SC (step S26). For example, the SEED generation request unit 65 transmits a SEED generation request signal that includes the vehicle ID code VID-A and the SEED code SC-2h.

The data center 10 generates the electronic key encryption key K in response to the SEED generation requests signal (step S27). For example, the data center 10 generates the electronic key encryption key K-2 by performing a computation using the SEED code SC-2h received from the immobilizer ECU 6 and the key generation logic h.

Then, in step S28, the data center 10 generates the SEED code SC-2Ag by performing a computation using the generated electronic key encryption key K-2, the vehicle ID code VID-A received from the immobilizer ECU 6, and the key generation logic g.

In step S29, the SEED reading unit 64 of the immobilizer ECU 6 transmits a second SEED request signal, which requests for the SEED code SC, to the data center 10.

When receiving the second SEED request signal, the data center 10 transmits a SEED signal including the SEED code SC-2Ag generated in step S28 to the immobilizer ECU 6 (step S30).

In step S31, the SEED reading unit 64 of the immobilizer ECU 6 obtains the SEED code SC-2Ag from the SEED signal. The encryption key generation unit 66 generates the electronic key encryption key K-2 by performing a computation using the SEED code SC-2Ag obtained by the SEED reading unit 64, the vehicle ID code VID-A, and the key generation logic g. In this manner, the immobilizer ECU 6 generates the electronic key encryption key K-2 using the SEED code SC-2Ag generated by the data center 10 and obtained from the data center 10.

In step S32, the encryption key registration unit 67 of the immobilizer ECU stores the electronic key encryption key K-2, which is generated by the encryption key generation unit 66, in the memory 69 to register the electronic key encryption key K-2 to the immobilizer ECU 6. The registered electronic key encryption key K-2 may be used for subsequent verification of the immobilizer ECU 6 and the electronic key 2b.

In step S33, the vehicle ID writing unit 61 of the immobilizer ECU 6 transmits a vehicle ID signal that includes the vehicle ID code VID-A from the coil antenna 5.

When the electronic key 2b receives the vehicle ID signal, in step S34, the transponder 4 stores the vehicle ID code VID-A in the memory 42 of the electronic key 2b.

In step S35, the database updating unit 68 of the immobilizer ECU 6 provides the database update signal to the data center 10 to update the information of the data center 10. In step S36, the data center 10 stores the key ID code KID-2 of the electronic key 2b in the ECU database 9a.

The additional registration of the electronic key 2c under an offline environment will now be described with reference to FIGS. 8 to 10.

Since the offline additional electronic key 2c is performed offline, an order sheet for manufacturing the offline additional electronic key 2b has to include a vehicle ID code VID that specifies a vehicle. The vehicle ID code VID of the vehicle 1 to which the electronic key 2c is to be registered may be obtained beforehand from the vehicle. In one example, the immobilizer ECU 6 is programmed so that when a person performing registration carries out a certain operation on the vehicle 1 to request for the vehicle ID code VID, the vehicle ID code VID is shown on the display 15. The person performing registration may write the vehicle ID code VID, which is shown on the display 15, on the order sheet. In another example, the immobilizer ECU 6 is programmed to show the vehicle ID code VID on the display 15 upon verification of the initial electronic key 2a that is inserted into the key cylinder.

Referring to FIG. 8, the vehicle ID code VID indicated on the order sheet specifies the immobilizer ECU 6 to which the electronic key 2c is to be additionally registered. In a manufacturing step of the offline additional electronic key 2c, the memory 42 of the electronic key 2c stores the vehicle ID code VID-A, a key ID code KID-3, a SEED code SC-3Ag, and an electronic key encryption key K-3, which is generated by performing a computation with the vehicle ID code VID-A, the SEED code SC-3Ag, and the key generation logic g.

The registration of the offline additional electronic key 2c performed offline in a maintenance garage or the like will now be described with reference to FIGS. 9 and 10. In an offline additional registration step, the registration tool 8 that is disconnected from the network 20 is connected to the vehicle 1. Accordingly, the immobilizer ECU 6 cannot communicate with the database 9.

Figure 9:
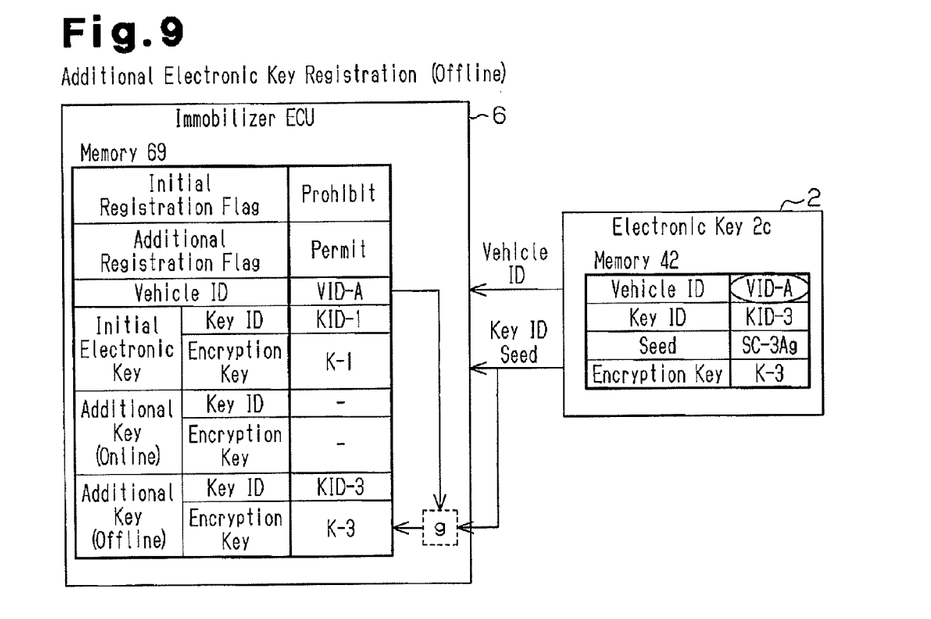
FIG. 9 is a schematic diagram illustrating manufacturing steps of an additional electronic key.

Referring to FIG. 9, in the offline additional registration step, the immobilizer ECU 6 reads the key ID code KID-3 and the SEED code SC-3Ag from the offline additional electronic key 2c. The immobilizer ECU 6 generates the electronic key encryption key K-3 by performing a computation using the vehicle ID code VID-A, the obtained SEED code SC-3Ag, and the key generation logic g. Then, the immobilizer ECU 6 stores the electronic key encryption key K-3 in the memory 69. The immobilizer ECU 6 cannot access the data center 10 and thus does not reflect the electronic key encryption key K-3 on the database 9.

Figure 10:
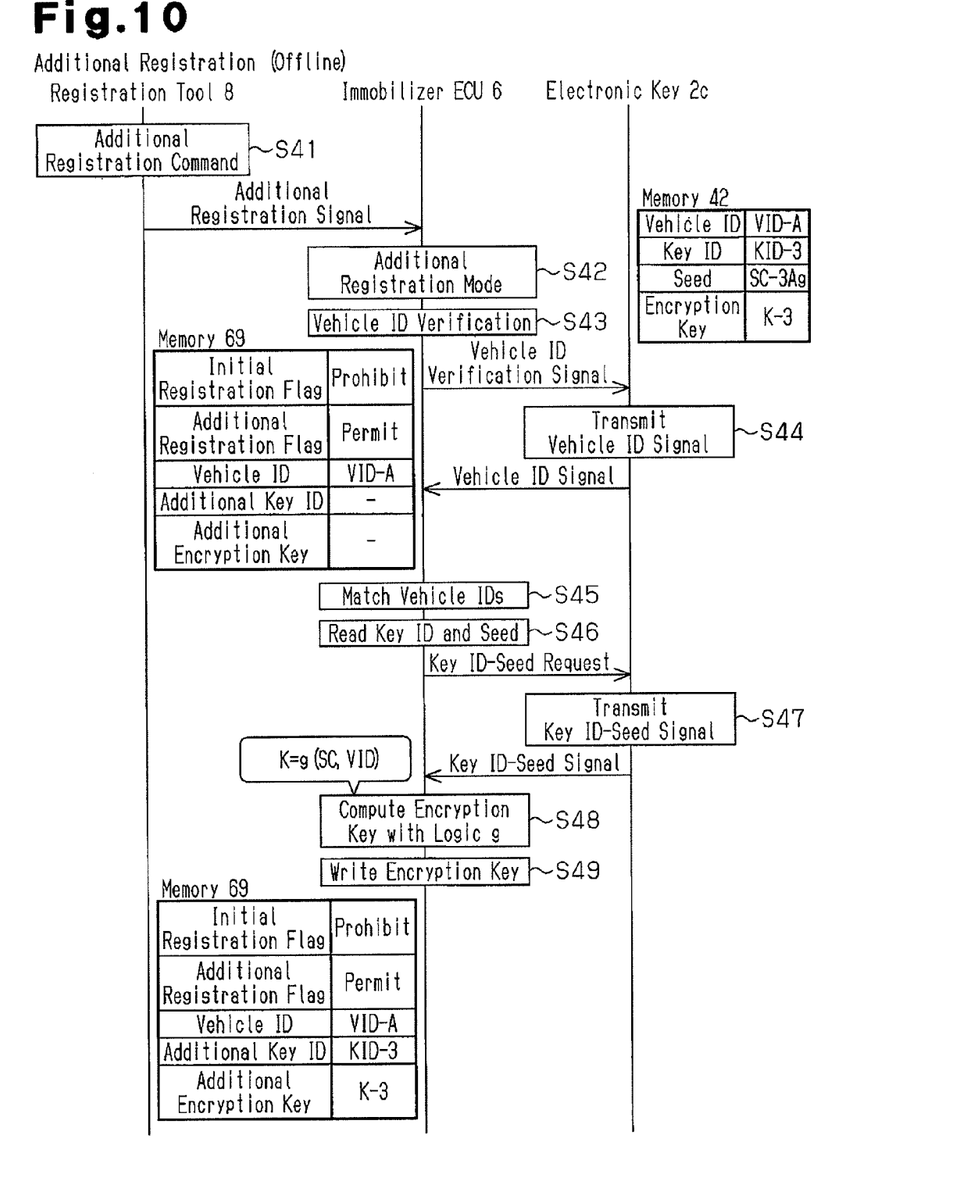
FIG. 10 is a sequence chart of the registration steps of the additional electronic key.

In detail, referring to FIG. 10, when the person performing the registration operates the operation unit 82 and sets additional registration, the registration tool 8 provides the immobilizer ECU 6 with an additional registration signal as an additional registration instruction (step S41). When receiving the additional registration signal, the immobilizer ECU 6 switches the operation mode to the additional registration mode (step S42). For example, the mode switching unit 60 switches to the additional registration mode that additionally registers an electronic key 2 to the immobilizer ECU 6.

The vehicle ID verification unit 62 of the immobilizer ECU 6 transmits a vehicle ID check signal to the offline additional electronic key 2c from the coil antenna 5 to check the vehicle ID code (step S43).

When the offline additional electronic key 2c receives the vehicle ID check signal, in step S44, the transponder 4 of the electronic key 2c transmits a vehicle ID signal including the vehicle ID code VID-A stored in the memory 42 from the transmission-reception antenna 21 to the immobilizer ECU 6.

When receiving the vehicle ID signal, the immobilizer ECU 6 checks whether or not the vehicle ID code in the signal conforms to the vehicle ID code of the immobilizer ECU 6. When the codes conform (step S45), in step S46, the key ID writing unit 63 of the immobilizer ECU 6 transmits a key ID-SEED request signal to the offline additional electronic key 2c from the coil antenna 5 to request for the key ID code KID and the SEED code SC.

When the offline additional electronic key 2c receives the key ID-SEED request signal, in step S47, the transponder 4 transmits a key ID-SEED signal, which includes the key ID code KID-3 and the SEED code SC-3Ag that are stored in the memory 42, to the immobilizer ECU 6 from the transmission-reception antenna 21.

When the immobilizer ECU 6 receives the key ID-SEED signal, in step S48, the SEED reading unit 64 obtains the SEED code SC-3Ag from the key ID-SEED signal. The encryption key generation unit 66 generates the electronic key encryption key K-3 by performing a computation with the SEED code SC-3Ag obtained by the SEED reading unit 64, the vehicle ID code VID-A in the memory 69, and the key generation logic g. In this manner, the immobilizer ECU 6 uses the SEED code SC-3Ag obtained from the offline additional electronic key 2c to generate the electronic key encryption key K-3.

In step S49, the encryption key registration unit 67 of the immobilizer ECU 6 stores the electronic key encryption key K-3, which is generated by the encryption key generation unit 66, in the memory 69 to register the electronic key encryption key K-3 to the immobilizer ECU 6. The registered electronic key encryption key K-3 may be used for subsequent verification of the immobilizer ECU 6 and the electronic key 2c.

In the electronic key registration system 7, regardless of whether or not the immobilizer ECU 6 is communicable with the data center 10, the electronic key 2 may be additionally registered. Further, the immobilizer ECU 6 obtains the SEED code SC from the electronic key 2, and generates electronic key encryption key K from the SEED code SC. The electronic key encryption key K is not transmitted between the electronic key 2 and the immobilizer ECU 6 for additional registration of the electronic key 2. This makes it difficult for someone to obtain the electronic key encryption key K. In the initial registration of the electronic key 2, the electronic key 2 obtains the vehicle ID code VID-A stored beforehand in the immobilizer ECU 6, the immobilizer ECU 6 obtains the SEED code SC-1f stored beforehand in the electronic key 2, and the encryption key K-1 is generated by performing a computation using the SEED code SC-1f and the key generation logic f. Prior to the initial registration, the electronic key 2 and the immobilizer ECU 6 do not store the vehicle ID code VID-A and the encryption key K-1, respectively. This eliminates the need for the electronic key 2 including the vehicle ID code and the immobilizer ECU 6 including the encryption key to be shipped out together as a set from a factory. The electronic key 2 subsequent to initial registration stores the vehicle ID code VID-A and thus cannot be registered to another immobilizer ECU 6. As a result, security is improved, while facilitating registration.

The present embodiment has the advantages described below.

(1) An online immobilizer ECU 6 returns the vehicle code VID and the SEED code SC-2h, which is read from the online additional electronic key 2b, to the data center 10. The data center 10 generates the electronic key encryption key K-2 by performing a computation using the SEED code SC-2h and the key generation logic h, and generates the SEED code SC-2Ag by performing a computation using the generated electronic key encryption key K-2, the vehicle ID code VID-A, and the key generation logic g. The immobilizer ECU 6 obtains the SEED code SC-2Ag from the data center 10. The immobilizer ECU 6 generates the electronic key encryption key K-2 by performing a computation using the vehicle ID code VID-A, the obtained SEED code SC-2Ag, and the key generation logic g. Then, the immobilizer ECU 6 stores the generated electronic key encryption key K-2. In contrast, an offline immobilizer ECU 6 that cannot communicate with the data center 10 generates the electronic key encryption key K-3 by performing a computation using the SEED code SC-3Ag stored in the offline additional electronic key 2c, the vehicle ID code VID-A stored in the immobilizer ECU 6, and the key generation logic g. Then, the immobilizer ECU 6 stores the generated electronic key encryption key K-3. In this manner, the immobilizer ECU 6 is capable of additionally registering an electronic key 2 to the immobilizer ECU 6 online and offline. This improves security, while facilitating registration.

(2) In the initial manufacturing step, the immobilizer ECU 6 stores the vehicle ID code VID-A but not the electronic key encryption key K-1. Further, the initial electronic key 2a stores the electronic key encryption key K-1 but not the vehicle ID code VID-A. During initial manufacturing, the information stored in the electronic key 2 is not paired with the information stored in the immobilizer ECU 6. Thus, there is no need to ship the electronic key 2 and the immobilizer ECU 6 together out of the factory. In the initial registration step, the immobilizer ECU 6 obtains the SEED code SC-1f from the initial electronic key 2a, generates the electronic key encryption key K-1 through a computation using the SEED code SC-1f and the key generation logic f, and stores the electronic key encryption key K-1. Thus, the electronic key 2 corresponds to only the immobilizer ECU 6 to which the electronic key encryption key K is registered and does not correspond to the immobilizer ECU 6 of another vehicle. This allows for elimination of the registration of the initial electronic key 2a to the immobilizer ECU 6 of another vehicle and thereby improves security, while facilitating registration.

(3) The electronic key 2 stores the vehicle ID code VID. The immobilizer ECU 6 may determine whether or not the initial electronic key 2 corresponds to the immobilizer ECU 6 based on whether or not the vehicle ID code VID of the immobilizer ECU 6 conforms to the vehicle ID code VID of the electronic key 2.

(4) The key ID code KID of the additional electronic key 2b and or 2c is stored in the immobilizer ECU 6. The immobilizer ECU 6 may determine whether or not the additional electronic key 2b and/or 2b corresponds to the immobilizer ECU 6 based on whether or not the key ID code VID stored in the immobilizer ECU 6 conforms to the key ID code KID of the electronic key 2.

It should be apparent to those skilled in the art that the present invention may be embodied in many other specific forms without departing from the spirit or scope of the invention. Particularly, it should be understood that the present invention may be embodied in the following forms.

The immobilizer ECU 6 that registers the electronic key 2 in an offline environment may be replaced by a new immobilizer ECU 6 under an online environment. The immobilizer ECU 6 that registers the electronic key 2 in an online environment may be replaced by a new immobilizer ECU 6 under an offline environment.

In the additional electronic key manufacturing step, the key ID code KID of the additional electronic key 2b and/or 2c does not have to be stored in the immobilizer ECU 6.

In the initial registration step, the vehicle ID code VID does not have to be stored in the initial electronic key 2a.

The key generation logic f serving as a third logic and used in the initial registration step may be the same as the key generation logic h serving as a first logic and used in the additional electronic key manufacturing step and the additional registration step.

Before executing the additional registration, the additional registration step may include verifying the person performing the registration. For example, the person performing the registration may have an ID code and a password used for verification by the data center 10.

The user of the vehicle may be the person performing registration or a different person.

The registration tool may be a dedicated registration tool or a device formed by a versatile computer such as a personal computer or smartphone incorporating software used for registration.

In the initial registration step, the SEED code may be deleted from the memory 42 of the electronic key 2 after initial registration.

The encryption key may be registered after challenge-response verification is performed in the initial registration step and the additional registration step.

Instead of showing the vehicle ID code VID to the user or the person performing registration on the display 15 of the vehicle 1, a mail be set to a mail address designated by the user or the person performing registration. This allows for only the user or the person performing registration who receives the mail to check the vehicle ID code VID.

The initial registration prohibition operation may be an operation other that performed with the ignition switch 14.

In the above embodiment, the present invention is applied to the immobilizer system 3 of a type that inserts the electronic key 2 into the key cylinder. However, the present invention may be applied to an electronic key system of a type that becomes communicable when the electronic key 2 enters a communication area formed by the vehicle 1.

In the above embodiment, the present invention is applied to an electronic key system of the vehicle 1. Instead, the present invention may be applied to an electronic key system for a building such as a house.

The present examples and embodiments are to be considered as illustrative and not restrictive, and the invention is not to be limited to the details given herein, but may be modified within the scope and equivalence of the appended claims.

The invention claimed is:

1. An electronic key registration system that registers an electronic key device to a vehicle, the electronic key registration system comprising:
   a controller arranged in the vehicle and capable of accessing a data center through at least a network;
   an initial electronic key device, a first additional electronic key device, and a second additional electronic key device, each storing a unique key ID code and a unique encryption key, wherein each encryption key is used for encrypted communication between the corresponding electronic key device and the vehicle to perform verification; and
   a computer-readable medium having instructions stored thereon that include:
     a first set of instructions configured to store a vehicle ID code in the controller when manufacturing the controller;
     a second set of instructions configured to
       generate, with the first additional electronic key device, the encryption key of the first additional electronic key device by performing a computation using a first encryption key generation code stored in the first additional electronic key device and a first logic, and
store the generated encryption key in the first additional electronic key device to manufacture the first additional electronic key device;
a third set of instructions configured to
transmit, with the controller to the data center online, the vehicle ID code and the first encryption key generation code that is stored in the first additional electronic key device,
generate, with the data center, the electronic key device encryption key of the first additional electronic key device by performing a computation using the received first encryption key generation code and the first logic,
generate, with the data center, a second encryption key generation code by performing a computation using the generated electronic key device encryption key, the vehicle ID code, and the second logic,
obtain, with the controller online, the second encryption key generation code from the data center,
generate, with the controller, the encryption key of the first additional electronic key device by performing a computation using the vehicle ID code, the obtained second encryption key generation code, and the second logic, and
store, in the controller, the generated electronic key device encryption key to register the first additional electronic key device;
a fourth set of instructions configured to
store, in the second additional electronic key device, the vehicle ID code corresponding to information indicated on an order sheet, a third encryption key generation code used to generate the encryption key of the second additional electronic key device, the encryption key of the second additional electronic key device generated by performing a computation using the vehicle ID code, the third encryption key generation code, and a second logic to manufacture the second additional electronic key device; and
a fifth set of instructions configured to
read, with the controller, the third encryption key generation code from the second additional electronic key device,
generate, with the controller that is disconnected from the data center, the encryption key of the second additional electronic key device by performing a computation using the third encryption key generation code, the communication ID code stored in the controller, and the second logic, and
store, in the controller that is disconnected from the data center, the encryption key of the second additional electronic key device.

2. The electronic key registration system according to claim 1, wherein the instructions of the computer-readable medium further include:
instructions configured to
store, in the initial electronic key device, an initial encryption key generation code and the encryption key of the initial electronic key device that is generated by performing a computation using the initial encryption key generation code and a third logic to manufacture the initial electronic key device; and instructions configured to
obtain, with the controller, the initial encryption key generation code from the initial electronic key device,
generate, with the controller, the encryption key of the initial electronic key device by performing a computation using the initial encryption key generation code and the third logic, and
store, in the controller, the generated encryption key to register the initial electronic key device.

3. The electronic key registration system according to claim 2, wherein the instruction configured to register the initial electronic key device includes writing, to the initial electronic key device, the vehicle ID code stored in the controller.

4. The electronic key registration system according to claim 1, wherein
the second set of instructions include an instruction configured to store the key ID code in the first additional electronic key device,
the third set of instructions include an instruction configured to store the key ID code of the first additional electronic key device in the controller,
the fourth set of instructions include an instruction configured to store the key ID code in the second additional electronic key device, and
the fifth set of instructions includes an instruction configured to store the key ID code of the second additional electronic key device in the controller.

5. The electronic key registration system according to claim 2, wherein
the instruction configured to manufacture the initial electronic key device includes storing the key ID code in the initial electronic key device, and
the instruction configured to register the initial electronic key device includes storing the key ID code of the initial electronic key device in the controller.

6. The electronic key registration system according to claim 2, wherein the third logic is the same as the first logic.

7. An electronic key registration system, comprising:
a registration tool that outputs a registration signal for requesting for registering an electronic key device to a vehicle;
a controller arranged in the vehicle and capable of accessing a data center through at least a network, the controller storing a vehicle ID code; and
an electronic key device storing an encryption key, wherein the electronic key device is configured to use the encryption key when performing a wireless verification communication with the controller of the vehicle,
wherein the registration tool, the controller, the electronic key device, and the data center include one or more computer-readable media having instructions stored thereon,
wherein the controller is configured to receive the registration signal from the registration tool and to determine whether the received registration signal is an initial registration signal or an additional registration signal,
wherein when the registration signal is an initial registration signal, the controller and the electronic key device are programmed to
obtain, with the controller, an initial encryption key generation code from the electronic key device,
generate, with the controller, the encryption key of the electronic key device by performing a computation using the initial encryption key generation code and a third logic, and store, in the controller, the generated encryption key of the electronic key device to register the electronic key device, wherein when the registration signal is an additional registration signal and the controller is able to communicate with the data center through at least the network, the controller and the data center are programmed to transmit, with the controller to the data center online, the vehicle ID code and a first encryption key generation code that is stored in the electronic key device, generate, with the data center, the encryption key of the electronic key device by performing a computation using the received first encryption key generation code and a first logic, generate, with the data center, a second encryption key generation code by performing a computation using the generated encryption key of the electronic key device, the vehicle ID code, and a second logic, obtain, with the controller online, the second encryption key generation code from the data center, generate, with the controller, the encryption key of the electronic key device by performing a computation using the vehicle ID code, the obtained second encryption key generation code, and the second logic, and store, in the controller, the generated encryption key of the electronic key device to register the electronic key device, wherein when the registration signal is an additional registration signal and the controller is not able to communicate with the data center through at least the network, the controller is programmed to read, with the controller, a third encryption key generation code from the electronic key device, generate, with the controller that is disconnected from the data center, the encryption key of the electronic key device by performing a computation using the third encryption key generation code, the communication ID code stored in the controller, and the second logic, and store, in the controller that is disconnected from the data center, the encryption key of the electronic key device to register the electronic key device.

* * * * *